United States Patent [19]

Beirne

[11] Patent Number: 4,472,608
[45] Date of Patent: Sep. 18, 1984

[54] SUBSCRIBER LINE INTERFACE CIRCUIT

[75] Inventor: Patrick R. Beirne, Stittsville, Canada

[73] Assignee: Mitel Corporation, Kanata, Canada

[21] Appl. No.: 285,658

[22] Filed: Jul. 21, 1981

[30] Foreign Application Priority Data

Jan. 23, 1981 [CA] Canada .................................. 369226

[51] Int. Cl.$^3$ ............................................. H04B 1/58
[52] U.S. Cl. ........................ 179/170 NC; 179/170 D
[58] Field of Search ....... 179/170 R, 170 D, 170 NC, 179/170 T

[56] References Cited

U.S. PATENT DOCUMENTS

| 3,824,344 | 7/1974  | James et al. ..................... | 179/170 D  |
| 3,970,805 | 7/1976  | Thomas ........................ | 179/170 NC |
| 4,041,252 | 8/1977  | Cowden ........................ | 179/170 NC |
| 4,053,722 | 10/1977 | Nahay .......................... | 179/170 NC |
| 4,388,500 | 6/1983  | Regan .......................... | 179/170 T  |

OTHER PUBLICATIONS

J. Sergo, Jr.; "DSS Quad Line Circuit"; International Symposium on Subscriber Loops and Services Conference Record; Mar. 1978; pp. 182–184.

Primary Examiner—G. Z. Robinson
Assistant Examiner—Randall P. Myers
Attorney, Agent, or Firm—Alan H. Levine

[57] ABSTRACT

A subscriber line interface circuit for coupling a balanced communication line with unbalanced bidirectional or a pair of unidirectional communication lines. Line current is fed to the line via a low resistance path for maximum current supply, via a circuit which matches the line impedance, and also provides high resistance protection to the output of amplifiers feeding the balanced line. Since a low resistance d.c. current feed is used, a voltage boost is not required. However lightning protection is obtained for the outputs of the amplifiers which feed the line, at the same time as virtually optimum line impedance matching and sufficient line current feed. The circuit is comprised of a balanced line including a lead pair, a pair of matched feed resistors for providing a low resistance path, each connected to one of the pair for applying a d.c. line current from a power source to the line, the total resistance of the feed resistors being a fraction of the d.c. line impedance. A circuit is provided for receiving a signal from the balanced line, and a further circuit applies a predetermined amplitude of the signal received from the balanced line back to the balanced line with a signal aiding polarity so as to raise the apparent impedance of the line for the signal at the lead pair, while allowing d.c. line current to be fed to the line via the low resistance path.

6 Claims, 3 Drawing Figures

SUBSCRIBER LINE INTERFACE CIRCUIT

This invention relates to a subscriber line interface circuit for coupling a balanced communication line with unbalanced bidirectional or incoming and outgoing signal communication lines in a telephone system.

Subscriber line interface circuits are generally used to couple balanced subscriber lines with unbalanced lines used in modern telephone switching systems. While in the past hybrid networks which included hybrid transformers were commonly used for this purpose, more recently semiconductor circuits which avoid the use of the bulky transformers and are compatible with intergated circuits have come into use.

One such semiconductor interface circuit is described in U.S. Pat. No. 4,041,252 issued Aug. 9, 1977 to North Electric Company. In this circuit, an input signal from an unbalanced line is applied through oppositely poled amplifiers in series with a pair of resistors to the balanced line. D.C. line current is applied to the balanced line through the power output stage of the amplifiers and through the aforenoted resistors.

An incoming signal from the balanced line is applied through a capacitor and resistor in series with each of the inputs of a differential amplifier, which feeds the unbalanced line through an output amplifier. Cancellation of the incoming signal against appearing in the output signal applied to the balanced line is accomplished by the use of a feedback network coupling the output signal of one of the oppositely poled output amplifiers to the output of the differential amplifier, whereby a signal cancellation effect is obtained.

A problem exists in this prior art circuit which involves the d.c. line current feed circuit to the balanced line. The resistors which carry the line current to the balanced line are of equal resistance, and ideally in total match the impedance of the balanced line. Balanced lines typically have nominal line impedances of either 900 or 600 ohms. Thus for a 900 ohm balanced line, each of the resistors will be 450 ohms. However since the line current feeding the line passes through these resistors, the current draw is limited by their resistance. A 48 volt source has been found to furnish insufficient current to a standard 600 or 900 ohm line, and a voltage boost has been found to be required to drive extra current to the line, resulting in an increase in complexity and cost of the circuit.

From the standpoint of high voltage protection of the amplifier outputs, it is desirable to have the noted resistors as high valued as possible, which clearly is contrary to the requirement for a low impedance feed for maximum current supply, and for a matching feed for optimum impedance match.

In the present invention, means is provided for feeding D.C. line current to the line via a low resistance path for maximum current supply, yet with an input impedance which matches the nominal line impedance, and also providing high resistance protection to the output of the amplifiers feeding the balanced line. Since a low D.C. resistance current feed is used, the voltage boost required in the prior art circuit is not required. However lightning protection is obtained for the outputs of the amplifiers feeding the line, at the same time as virtually optimum line impedance matching and sufficient D.C. line current feed.

According to a preferred embodiment of the invention, a line interface circuit is comprised of a telephone line interface circuit comprising a balanced line including a lead pair, a pair of matched feed resistors for providing a low resistance path, each connected to one lead of the pair for applying d.c. line current from a power source to said line, the total resistance of the feed resistors being a fraction of the d.c. line impedance, means for receiving a signal from the balanced line, means for applying a predetermined amplitude of the signal received from the balanced line back to the balanced line with signal aiding polarity so as to raise the apparent impedance of the line for said signal at the lead pair, while allowing d.c. line current to be fed to the line via the low resistance path.

More particularly, the line interface circuit is comprised of a balanced line including a lead pair, and a pair of current amplifiers adapted to drive the balanced line each with the opposite phase of a signal which is to be applied to the balanced line. A pair of matched build-out resistors is connected with each resistor in series with the output of a corresponding one of the amplifiers. Each resistor of a pair of matched current feed resistors is connected to a corresponding lead of the lead pair for applying a d.c. line current from a power source to the line. The total resistance of the feed resistors is a fraction of the line impedance. A differential amplifier having a high input impedance has its input terminals connected to the line. A circuit is connected to the output of the differential amplifier for cancelling incoming signals from the unbalanced line applied to the balanced line from the current amplifiers at the output of the differential amplifier, and a further circuit is connected to the output of the differential amplifier and the inputs of the current amplifiers for applying a predetermined amplitude of the signal received from the balanced line back to the balanced line so as to provide an apparent line input circuit impedance substantially the same as the nominal line impedance. Thus an apparent matched line impedance is obtained at the same time as a low resistance line current feed.

Still more particularly the present telephone line interface circuit is comprised of tip and ring leads for connection to a balanced line, an incoming signal terminal for carrying a signal incoming from a first unbalanced line and an outgoing signal terminal for carrying a signal outgoing to a second unbalanced line, and a pair of resistors connected to the tip and ring leads respectively for carrying d.c. line current from a power source to the line, the resistors being matched and having a total resistance which is a fraction of the a.c. line resistance. A pair of first amplifiers is connected in a circuit to drive the tip and ring leads differentially. Each resistor of a pair of build-out resistors is connected in an a.c. coupled circuit between an output of a corresponding one of the first amplifiers and the tip or ring lead, the total resistance of the build-out resistors being a multiple of the line resistance. The inputs of a differential amplifier are connected to the tip and ring leads, and its output is connected to the non-inverting input of a further operational amplifier. The output of the further operational amplifier is connected in a circuit to the outgoing signal terminal. The inverting input of the further operational amplifier is connected via a balancing circuit to the incoming signal terminal. A circuit is provided for adding the incoming signal from said first unbalanced line to the outgoing signal to said second unbalanced line and for applying a resulting sum signal to the inputs of both of the first amplifiers, the outgoing signal containing a fraction of a signal on the balanced tip and ring leads being sufficient to raise the apparent impedance of the tip and ring leads to the nominal line input impedance at the frequencies of interest. The balancing circuit is adapted to apply sufficient signal from the incoming signal terminal to the inverting input of the further operational amplifier so as to substantially cancel signals incoming from the first unbalanced line applied to the input of the further operational amplifier via the balanced line from being applied to the outgoing signal terminal.

It will thus be seen that d.c. line current for powering the line is fed via resistors which are a fraction of the line impedance, but due to the balancing circuit which applies a fraction of the signal received from the balanced line back to the balanced line, the resulting apparent input impedance of the circuit is raised and appears to match the line impedance. The input impedance to the differential amplifier is relatively high, and thus does not appreciably affect the apparent line impedance. The outputs of the amplifiers which drive the balanced line have resistors in series which are a multiple of the line impedance, and thus are substantially high voltage protected.

A better understanding of the invention will be obtained by reference to the detailed description below, and to the following drawings, in which.

Figure 1:
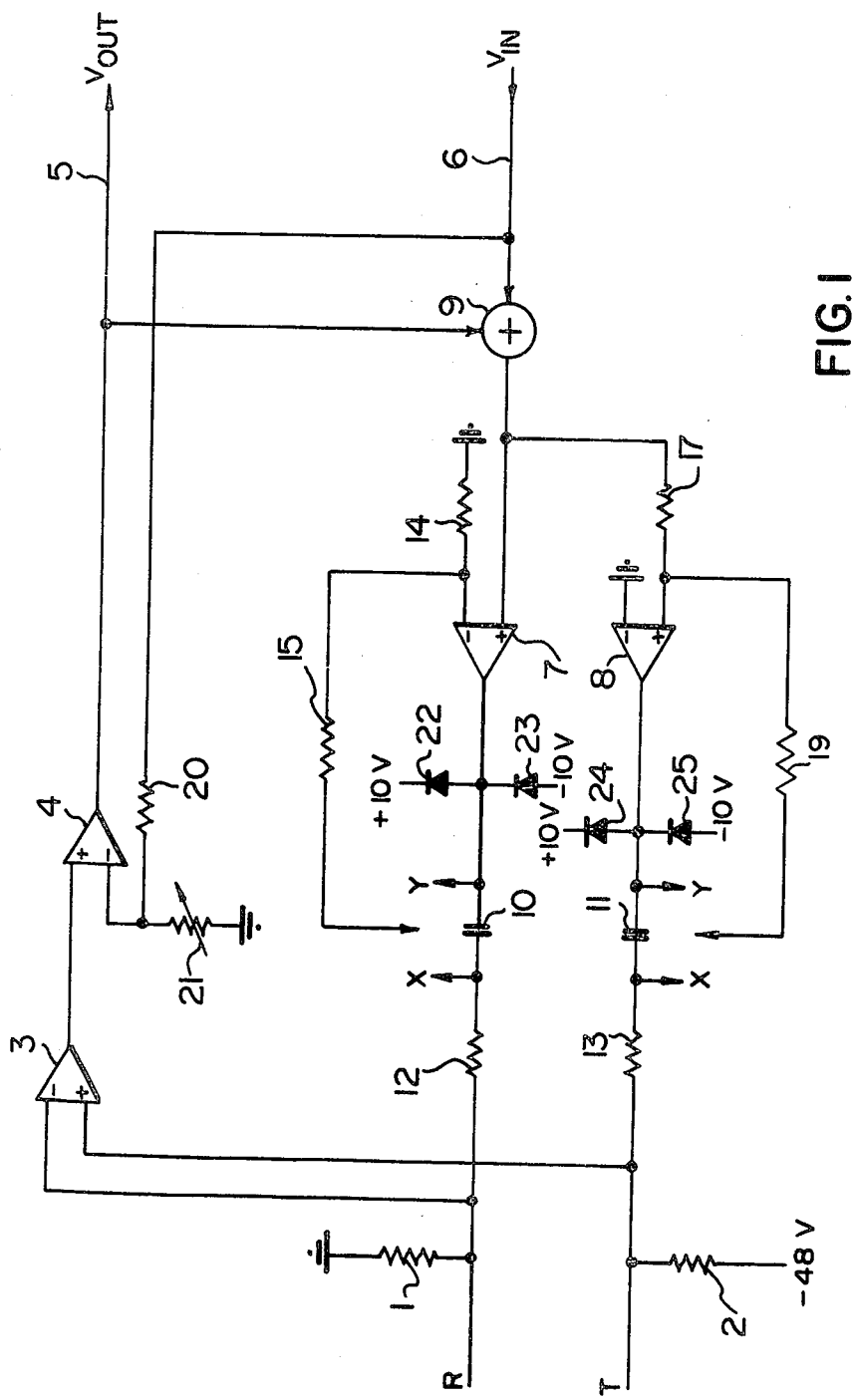
FIG. 1 is a schematic which illustrates the basic concepts of the invention.

Turning first to FIG. 1, leads T and R can be connected to terminals adapted to be connected to a balanced line such as a subscriber's line. A pair of resistors 1 and 2 are connected one to the T and one the R lead, the resistors also being connected to a source of line current, typically −48 V and ground, as shown. Resistors 1 and 2 are a fraction of the line resistance. For example where the line resistance is 900 ohms, each of the T and R leads are connected to corresponding inputs of a differential amplifier 3, the output of which is connected to the non-inverting input of operational amplifier 4. The output of operational amplifier 4 is connected to an outgoing lead 5 for carrying an output signal $V_{out}$; lead 5 will be referred to below as the $V_{out}$ lead.

Lead 6, for carrying an incoming signal $V_{in}$ (referred to below as the $V_{in}$ lead) is connected to the non-inverting input and the inverting input of current amplifiers 7 and 8 respectively through an adding circuit 9. The outputs of amplifiers 7 and 8 are connected via capacitors 10 and 11 in series with build-out resistors 12 and 13 respectively to the T and R leads.

The inverting input of amplifier 7 is connected via resistor 14 to ground and via resistor 15 to either of points X or Y located on opposite sides of capacitor 10. The summed output of adding circuit 9 is applied to the non-inverting input of amplifier 7. Similarly, the summed output of circuit 9 is applied to the inverting input of amplifier 8 via resistor 17. Resistor 19 is connected from the inverting input of amplifier 8 to either of points X or Y located on opposite sides of capacitor 11. The non-inverting input of amplifier 8 is connected to ground. Note that for some gain configurations, resistor 14 may be infinite, and is therefor omitted.

A balancing network is connected to the inverting input of amplifier 4. The basic balancing network is shown as resistor 20 connected from the $V_{in}$ lead to the inverting input of amplifier 4 and adjustable resistor 21 connected from the same input to ground.

While the $V_{in}$ and $V_{out}$ leads are shown as separate and distinct, i.e. as would be used to feed an unbalanced four wire line or the input and output of a coder-decoder (codec), the $V_{out}$ lead can instead be connected via a resistor to the $V_{in}$ lead, transforming the $V_{in}$ lead to an unbalanced bidirectional 2 wire line. This type of line would typically be connected to a junctor in a crosspoint type telephone switching system, for example.

The operation of the above-described circuit is as follows.

D.C. line current is fed from a power source such as a local battery via resistors 1 and 2 to the tip and ring leads from the T and R leads. Differential signals received from the tip and ring leads, e.g. originating at a subscriber's telephone set, are applied to differential amplifier 3 and are carried by amplifier 4 to the $V_{out}$ lead 5.

Signals received from the $V_{in}$ lead 6 and destined for the tip and ring leads are applied to the opposite polarity inputs of current amplifiers 7 and 8. The resulting signals, opposite in phase, are applied via a.c. coupling capacitors 10 and 11 and build-out resistors 12 and 13 to the T and R leads.

It should be noted that resistors 12 and 13 preferably are of high resistance, for protection of the outputs of amplifiers 7 and 8 from high transient voltages which may be present on the balanced line.

Protection diodes 22 and 23 are connected in series aiding, but opposing polarity relative to a source of potential, e.g. ±10 volts, their junction being connected to the junction between amplifier 7 and capacitor 10, although their junction can alternatively be connected to the junction of resistor 12 and capacitor 10 or to the R lead. Similarly connected protection diodes 24 and 25 are connected in series aiding, but opposing polarity relative to the source of potential, their junction being connected to a point between the output of amplifier 8 and the T lead similar to diodes 22 and 23. While diodes 22, 23, 24 and 25 provide primary voltage surge protection for amplifiers 7 and 8, they also serve to keep capacitors 10 and 11 biased, so that large valued electrolytic capacitors can be used if desired. Resistors 12 and 13 typically would be 1000 ohms each. In a typical application, the total resistance of resistors 1 and 2 would be about ½ the line resistance, and the total resistance of resistors 12 and 13 would be double the line resistance.

Since the line current feed to the tip and ring leads from the power source is entirely through passive resistors, the d.c. current path is easily controlled, and can be of an optimum value, which value can be substantially less than the line impedance. Current surges sometimes appearing across the line pass mostly through resistors 1 and 2, due to their low resistance. However a fraction of the surge current passes through high resistance resistors 12 and 13. Should the surge current through resistors 12 and 13 be greater than the maximum allowable output current of amplifiers 7 and 8, the excess surge current passes through protection diodes 22, 23, 24 and 25, thus protecting amplifiers 7 and 8.

To reduce common mode current and to maintain the best possible longitudinal balance, resistors 1 and 2 should be matched and resistors 12 and 13 should be matched. Amplifier 3 should also have good common mode current rejection. It is not important that the gain of amplifier 7 should be exactly equal to the gain of amplifier 8.

In order to remove signals arriving on the $V_{in}$ lead from being reapplied to the $V_{out}$ lead (which would occur since the $V_{in}$ signal is applied to the T and R leads which are connected to the input of differential amplifier 3), a fraction of the $V_{in}$ signal is applied via the network comprising resistors 20 and 21 to the $V_{out}$ lead with opposite phase, so as to cancel any $V_{in}$ signal which is on the $V_{out}$ lead. The fraction of the $V_{in}$ signal applied to the $V_{out}$ lead is adjusted by varying resistor 21, which forms a voltage divider with resistor 20, and is applied to operational amplifier 4 so as to be summed with the signal received from the T and R leads. Substantial cancellation of the $V_{in}$ signal which would otherwise appear on the $V_{out}$ lead is thus achieved. A complex network may be used in place of resistor 21.

Consider the tip terminal. The input impedance to incoming signals on the tip lead is equal to the parallel combination of resistors 2 and 13. However, a predetermined amplitude of the incoming signal is reapplied to the tip lead via the feedback circuit comprising amplifiers 3, 4 and 8, and adding circuit 9. The predetermined amplitude is dependent upon the total gain in the feedback path. By feeding the predetermined amplitude of the incoming signal back to the tip lead the effective impedance of resistor 13 can be made to appear negative with respect to incoming signals. In particular, the effective resistance, $R_{13}(eff)$, can be expressed as:

$$R_{13}(eff) = V_{TIP}/I_{in},$$

where $V_{TIP}$ is the voltage on the tip lead, and $I_{in}$ is the current flowing through resistor 13. This current can be expressed as:

$$I_{in} = \frac{V_{TIP} - V_{DRIVE}}{R_{13}}$$

where $V_{DRIVE}$ is the predetermined amplitude of the input signal which is fed back and appears at the output of amplifier 8, and $R_{13}$ is the resistance of resistor 13.

$V_{DRIVE}$ is a scaled representation of $V_{TIP}$, and can be expressed as:

$$V_{DRIVE} = X \cdot V_{TIP}$$

where X is the gain of the feedback path. Therefore, $$R_{13}(eff) = \frac{V_{TIP} R_{13}}{V_{TIP} - X \cdot V_{TIP}} = \frac{R_{13}}{1 - X}$$

Thus the effective resistance $R_{13}(eff)$ is determined by the actual resistance of resistor 13 and the gain in the feedback path.

The effective resistance of resistor 12 is determined in a similar manner, and the input impedance to incoming signals on the ring lead is given by the parallel combination of resistor 1 and the effective (negative) resistance of resistor 12.

Therefore, the input impedance to signals on the tip and ring leads can be made to match the nominal line impedance by selecting an appropriate feedback gain.

The result is a line interface circuit which matches the balanced line impedance, feeds d.c. operating current to the balanced line through a controlled low resistance, yet has current amplifiers 7 and 8 surge current protected.

As noted earlier, feedback loops from the inputs of amplifiers 7 or 8 can be connected to either of the corresponding points X or Y. The feedback loops connected to points Y allows a simpler amplifier biasing circuit to be used, but if the feedback loops are connected to points X, capacitors 10 and 11 can be substantially smaller than otherwise, e.g. as low as 2 microfarad. In the latter case, the feedback configurations change. An example is given in the detailed embodiment below.

In one successful embodiment, current amplifiers 7 and 8 were each type ML378 integrated circuit audio amplifier, which provides an output voltage swing up to 34 volts peak-to-peak, and an output current of which can rise as high as 1.5 amperes. The bandwidth of these amplifiers are 2 megahertz with a gain of 10.

Figure 2:
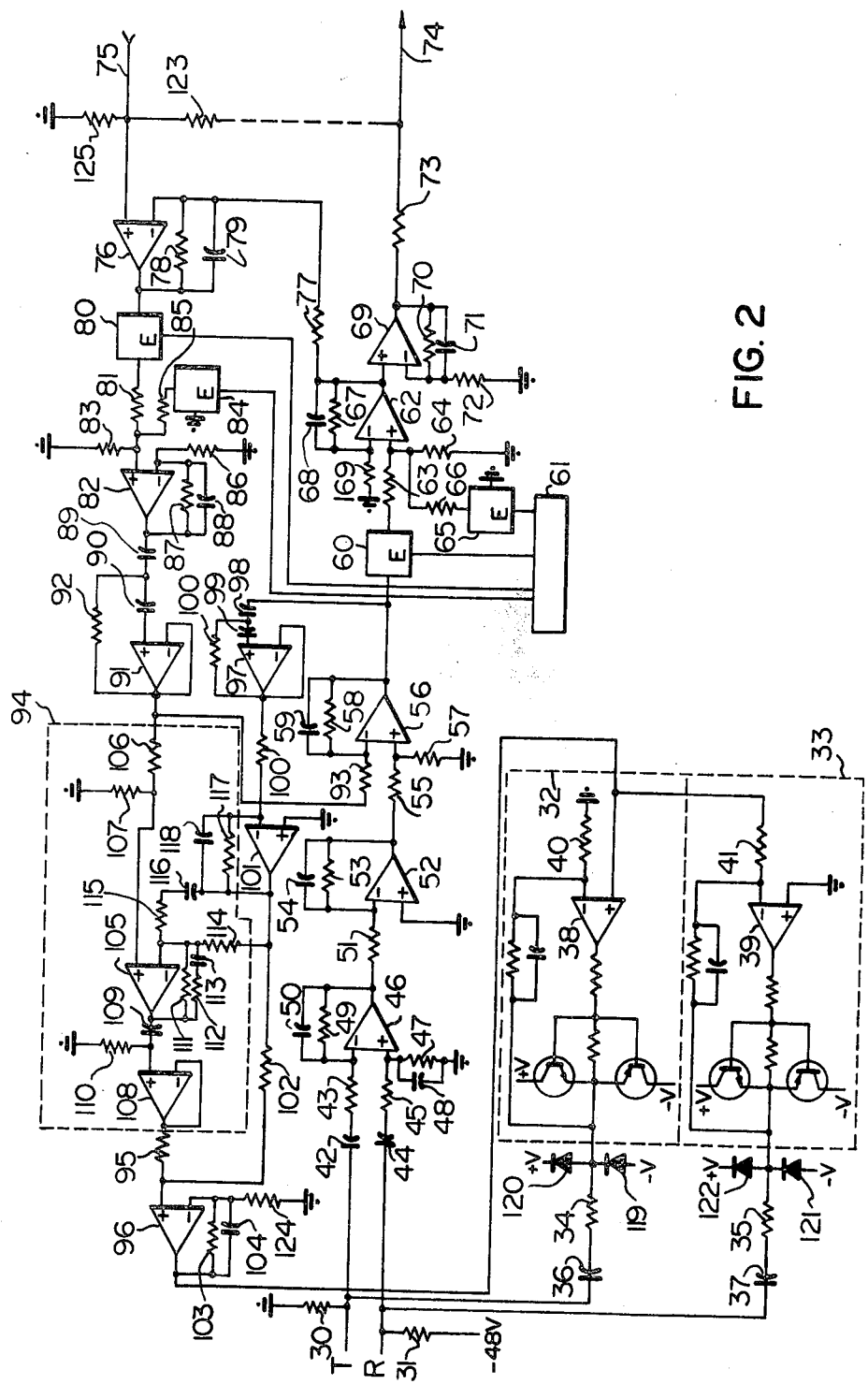
FIG. 2 is a schematic of the preferred embodiment of the invention.

FIG. 2 is a detailed schematic of a circuit according to this invention.

T and R leads for connection to balanced tip and ring leads have resistors 30 and 31 respectively connected to a power source, shown as $-48$ V and ground. A pair of current amplifiers 32 and 33 each have their outputs connected through corresponding build-out resistors 34 and 35 in series with capacitors 36 and 37 to the T and R leads respectively. The current amplifiers include operational amplifiers 38 and 39, each connected in series with a transistor power output stage of conventional construction.

The inverting input of operational amplifier 38 is connected to ground through resistor 40 and the non-inverting input of operational amplifier 39 is connected directly to ground. The non-inverting input of amplifier 38 and the inverting input of amplifier 39 in series with resistor 41 are connected together, and form a single input terminal for the current amplifiers 32 and 33. The latter amplifiers are well known in structure and need not be described in detail, but it should be noted that signals applied to their input appear opposite in phase at their outputs. The amplifiers thus operate in push-pull Class A or Class AB mode, applying d.c. isolated signals to the T and R leads.

The T and R leads are connected through the series circuits of capacitor 42 with resistor 43 and capacitor 44 with resistor 45 to the inputs of differential amplifier 46. The non-inverting input of amplifier 46 is connected through resistor 47 in parallel with capacitor 48 to ground, and its inverting input is connected through resistor 49 in parallel with capacitor 50 to its output to provide a feedback loop.

The output of differential amplifier 46 is connected through input resistor 51 to the inverting input of operational amplifier 52, which has its non-inverting input connected to ground. The output of amplifier 52 is connected to its inverting input through a feedback loop comprising resistor 53 in parallel with capacitor 54. The output of operational amplifier 52 is connected through resistor 55 to the non-inverting input of operational amplifier 56, this input also being connected to ground through resistor 57. The output of operational amplifier 56 is connected to its inverting input through a feedback loop comprising resistor 58 in parallel with capacitor 59.

The output of operational amplifier 56 is connected to the input of a solid state switch 60, which has its enable input E connected to an output of a decoder 61. Decoder 61 is connected to a control circuit which does not form part of this invention, and this is not shown.

The output of switch 60 is connected to the non-inverting input of operational amplifier 62 through resistor 63. The latter non-inverting input is connected to ground through resistor 64 and to the output of a solid state switch 65 through resistor 66. The input of solid state switch 65 is connected to ground, and its enable input E is connected to another output of decoder 61.

The output of operational amplifier 62 is connected back to its input via a feedback loop comprising resistor 67 and capacitor 68 in parallel. The inverting input of operational amplifier 62 is connected to ground through resistor 169.

The output of operational amplifier 62 is connected to the non-inverting input of operational amplifier 69, the output of which is connected via a feedback loop comprising the parallel circuit of resistor 70 and capacitor 71 to its non-inverting input, which input is connected to ground through resistor 72.

The output of operational amplifier 69 is connected through an impedance matching resistor 73 to unbalanced output lead 74. Output lead 74 corresponds to the $V_{out}$ lead of FIG. 1.

An input lead 75 (corresponding to $V_{in}$ lead of FIG. 1) is connected to the non-inverting input of an operational amplifier 76, which non-inverting input is also connected to ground through resistor 125. The inverting input of amplifier 76 is connected to the output of operational amplifier 62 through resistor 77. Inverting input of amplifier 76 is connected to its output through the parallel circuit of resistor 78 and capacitor 79.

The output of amplifier 76 is connected to the input of a solid state switch 80, the enable input E of which is connected to another output of decoder 61. The output of switch 80 is connected through resistor 81 to the non-inverting input of operational amplifier 82, with resistor 83 which is also connected to ground. Also connected to the non-inverting input of amplifier 82 is the output of solid state switch 84 through resistor 85, the switch 84 input being connected to ground. The enable input of switch 84 is connected to a further output of decoder 61.

The inverting input of amplifier 82 is connected to ground through resistor 86, and to its own output of via a feedback path comprising the parallel circuit of resistor 87 with capacitor 88.

The output of amplifier 82 is connected through capacitors 89 and 90 to the non-inverting input of operational amplifier 91. The output of amplifier 91 is connected directly to its inverting input, and also to the junction of capacitors 89 and 90 through resistor 92. The output of operational amplifier 91 is connected through resistor 93 to the inverting input of operational amplifier 56.

The output of operational amplifier 91 is connected via a phase shifting network 94 and through resistor 95 to the non-inverting input of operational amplifier 96.

The output of operational amplifier 56 is connected to the input of an operational amplifier 97 through a pair of series connected capacitors 98 and 99. The output of operational amplifier 97 is connected to the junction of capacitors 98 and 99 through resistor 100, and also directly to the non-inverting input thereof.

The output of operational amplifier 97 is connected through resistor 100 to the inverting input of operational amplifier 101, the non-inverting input of which is connected to ground, and which has its output connected through resistor 102 to the non-inverting input of operational amplifier 96. Passive components of the phase shifting network are connected to the inverting input and the output of operational amplifier 101 as will be described later.

The output of operational amplifier 96 is connected to the non-inverting input of operational amplifier 38 and to the inverting input of operational amplifier 39 through resistor 41. The output of operational amplifier 96 is also connected to its inverting input via a feedback path comprising resistor 103 in parallel with capacitor 104, the inverting input being connected to ground through resistor 124.

The phase shifting network was described earlier as a generalized circuit 94. The function of phase shifting network 94 is to compensate for phase shifts in the signal applied to the T and R leads caused by relatively small values of capacitors 36 and 37. It is desirable that these capacitors should be of small value in order to avoid the use of electrolytic capacitors, which experience has shown have limited lifetimes. When large capacitance non-electrolytic capacitors (e.g. up to 400 microfarads) become available the use of compensating phase shifting network 94 can be eliminated for audio and somewhat higher frequency signals. In the case in which each of capacitors 36 and 37 is, in a typical design, 1.5 microfarads (rated at 100 volts), phase shifting network 94 is required. However in the case in which capacitors 36 and 37 are each 100 microfarads (rated at 100 volts), phase shifting network 94 can be eliminated and substituted by a direct connection.

While phase shifting network 94 is necessary depending only on the values of capacitors 36 and 37, for the sake of completeness, a description of the structure of the phase shifting network will be given below.

The output of operational amplifier 91 is connected to the non-inverting input of an operational amplifier 105 through resistor 106, the same input being connected to ground through resistor 107.

The output of operational amplifier 105 is connected to the non-inverting input of operational amplifier 108 through capacitor 109, the latter input being connected to ground through resistor 110. The output of operational amplifier 108 forms the output of the phase shifting network, and is connected to resistor 95 as described earlier. The same output is connected directly to the inverting input of operational amplifier 108.

The inverting input of operational amplifier 105 is connected to its output via a feedback path comprising resistor 111 in parallel with the series circuit of resistor 112 and capacitor 113. The same inverting input is connected to the output of operational amplifier 101 via resistor 114 in parallel with the series circuit of resistor 115 with capacitor 116. The inverting input of operational amplifier 101 is connected to its output via a feedback path comprising resistor 117 in parallel with capacitor 118.

The output of current amplifiers 32 and 33 are preferably protected by protection diodes 119, 120, 121 and 122, diodes 119 and 120 being connected in series aiding, in the non-conductive direction, between a source of potential $-V$ and $+V$, their junction being connected to the output of current amplifier 32. Protection diodes 121 and 122 are similarly connected in the series aiding non-conducting direction between source of potential $-V$ and $+V$, their junction being connected to the output of current amplifier 33.

selected so as to form a differential amplifier of relatively high impedance; resistors 108 and 109 are typically very much greater in resistance than resistors 110 and 111. Resistances 108, 109, 110 and 111 are selected to establish a predetermined gain for differential amplifier 112.

Build-out resistors 102 and 103 are connected to the T and R leads respectively. The other side of these resistors are connected via capacitors 104 and 105 to the outputs of operational amplifiers 106 and 107 respectively. The junction of resistor 102 and capacitor 104 is connected to the inverting input of amplifier 106 through the series circuit of resistor 128 and capacitor 130, this inverting input also being connected to the output via resistor 131. The junction between resistor 103 and capacitor 105 is connected to the inverting input of amplifier 107 through the series circuit of resistor 127 and capacitor 129, this inverting input being connected to the output through resistor 132. The junction of resistor 127 and capacitor 129 is connected to the non-inverting input of amplifier 106 through resistor 126, and to the battery supply, e.g. −48 V through resistor 133. The non-inverting input of amplifier 107 is connected to common or ground. Resistors 131 and 132 should have very high resistance values.

The signal which is to be applied to the T and R leads is present at the output of operational amplifier 113, which output is connected to the non-inverting input of amplifier 106, and to the inverting input of amplifier 107 via resistor 126 and capacitor 129. A resistor 125 is connected between the inverting input of amplifier 113 and its output, while its non-inverting input is connected to common or ground. Amplifier 113 is configured as an inverting amplifier with a predetermined gain dependent on resistors 125 and 124. An output signal e.g. from the output channel of a CODEC 200 is applied via resistor 124 to the inverting input of amplifier 113. The output of amplifier 112 is connected through capacitor 122 to the non-inverting input of operational amplifier 114, which has its output connected to an input channel of CODEC 200. Capacitor 122 is also connected via resistor 123 to the inverting input of amplifier 113.

The output channel of CODEC 200 is connected via a network comprising the series circuit of resistors 118 and 115 (the latter being connected to ground), to the inverting input of amplifier 114 via resistor 129. The inverting input of amplifier 114 is connected to common or ground through resistor 130, which input is connected to its output through resistor 131.

The network referred to above can be modified, e.g. by connecting resistor 116 and capacitor 117 in parallel with resistor 115. Resistor 116 and capacitor 117 are preferably connected from the junction of resistors 118 and 115 to ground via a switch 134, which is shown with CODEC 200. The characteristics of the aforenoted network can thus be changed.

The output of amplifier 106 is connected to the junction of a pair of series connected diodes 119 and 120 which are connected in their reverse biased direction between sources of potential, e.g. +10 V and −10 V. The output of amplifier 107 is similarly connected to diodes 121 and 122 which are connected to the same sources of supply.

In operation, d.c. power is fed to the T and R leads for use by remote circuits, such as telephones, via resistors 100 and 101. The values of these resistors are typically 100 ohms to 300 ohms.

Signals received from the remote circuits are received on the T and R leads and are applied to the differentially connected amplifier 112, which corresponds to amplifier 3 in FIG. 1. The received signals are amplified to a predetermined amplitude dependent on the predetermined gain. The output signal is applied to amplifier 114. However a portion of the output signal from CODEC 200 is applied via the network associated with resistor 118 to the inverting input of amplifier 114. Here the two signals are subtracted, and the result appears at the output of amplifier 114, from where it is applied to the input circuit of CODEC 200.

The network referred to above models the signal coupling to the T and R leads, where resistor 118 represents the total circuit drive impedance and resistor 115 represents the termination across the T and R leads. Resistor 129 is typically much larger than either of resistors 118 or 115.

It should be noted that an alternative balance network comprised of resistor 116 and capacitor 117 can be used, in parallel with resistor 115, when switch 134 is closed.

The signal from the output of CODEC 200 is amplified by amplifier 113, and the predetermined amplitude of the signal received from the T and R leads and which appears at the output of amplifier 112 is added into the signal which is amplifier by amplifier 113, via the signal path which includes resistor 123. This addition occurs in a similar manner as described with reference to FIG. 1, in element 9.

Amplifiers 106 and 107 have unity gain, and couple the signal with opposite phase (e.g. in push-pull) through resistors 102 and 103 to the T and R leads. It should be noted that feedback exists through resistors 128 and 127, so that relatively low values of capacitance may be used for capacitors 104 and 105.

It should also be noted that feedback is coupled through capacitors 130 and 129, which allows the amplifiers to be biased near ground.

Amplifier 107 also amplifies any noise signals which may be present on the battery supply lead, which is applied to the amplifier through resistor 133, so as to cancel them.

Figure 3:
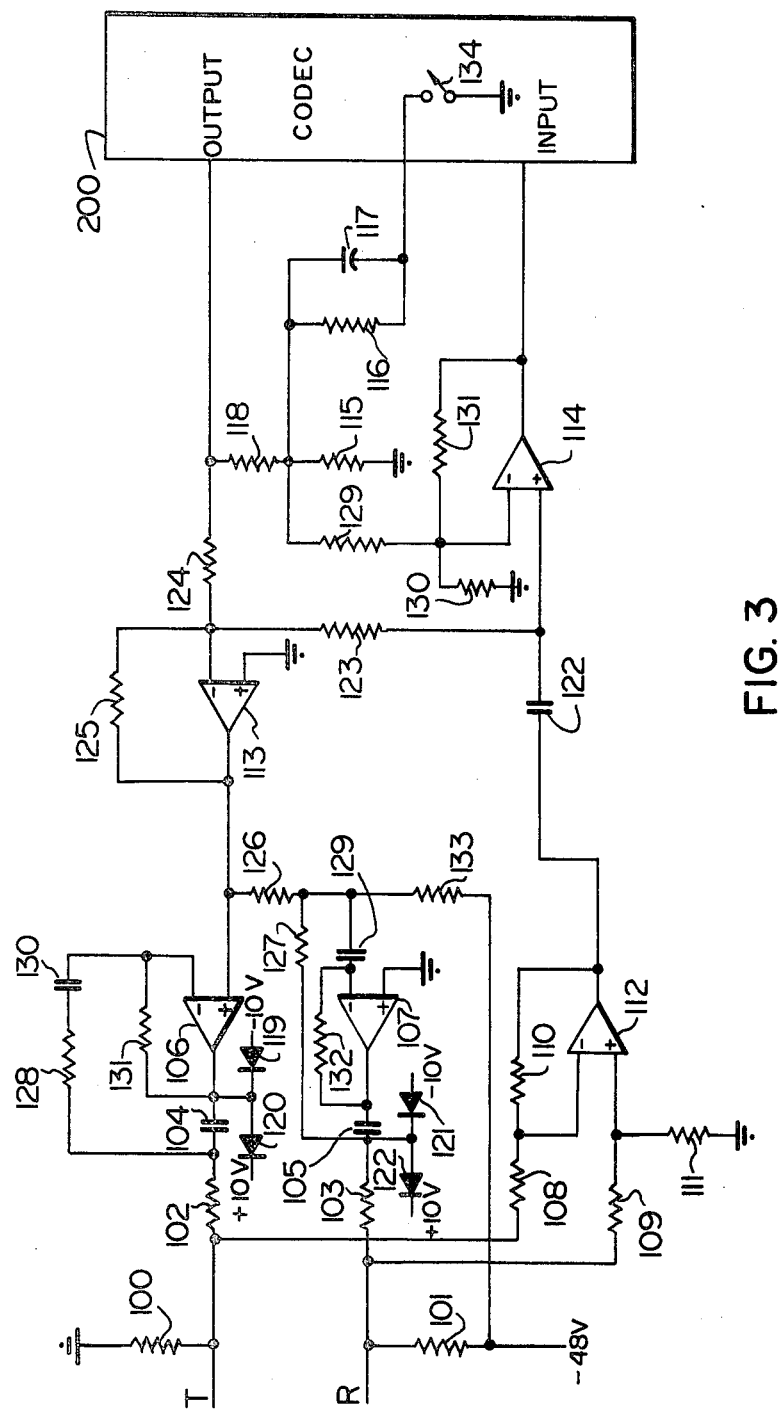
FIG. 3 is a schematic of another embodiment of the invention.

The embodiment of FIG. 3 is considerably simplified over the embodiment of FIG. 2. The unidirectional signal paths shown connected to a CODEC can however be substituted by a bidirectional signal path in a similar manner as that described earlier with reference to the embodiment of FIG. 2.

A person skilled in the art understanding this invention may now conceive of other embodiments, variations, or designs using the principles of this invention. All are considered to be within the sphere and scope of the invention as defined in the claims appended hereto.

The embodiments of the invention in which an exclusive property or privilege is claimed are defined as follows:

1. A telephone line interface circuit comprising:
   (a) tip and ring leads for connection to a balanced line having a predetermined line impedance,
   (b) an incoming signal terminal for carrying a signal incoming from a first unbalanced line and an outgoing signal terminal for carrying a signal outgoing to a second unbalanced line,
   (c) a pair of resistor means connected to the tip and ring leads respectively for carrying d.c. line current from a power source to said balanced line, the resistor means being matched and having a total Operation of the circuit is as follows. Line current is applied to the T and R leads at a selected time from −48 V and ground via resistors 30 and 31. Resistors 30 and 31 are selected for optimal current from the supply, typically 200 ohms, which is considerably less than the normal line impedance of 600 or 900 ohms.

Signals originating on a balanced subscribers line connected to the T and R leads are applied to the input of differential amplifiers 46, are d.c. isolated by capacitors 42 and 44, and are passed through resistors 43 and 46. Resistors 43 and 45 are typically 100K ohms each. The signal is passed through operational amplifiers 52 and 56, through switch 60, operational amplifiers 62 and 69 to output lead 74 via resistor 73. Since the output impedance of operational amplifier 69 is low, resistor 73 is included to match the line impedance of the circuit to which lead 74 is connected, e.g. a junctor. Where the junctor is nominally 600 ohms, resistor 73 should be the same.

Signals for transmission to the balanced line are applied from lead 75 to the input of operational amplifier 76, and are carried via switch 80, through operational amplifiers 82 and 91, through the phase shifting network 94 if it is provided, through operational amplifier 96, to the inputs of current amplifiers 32 and 33. The signal is applied to the T and R leads in a push-pull mode through resistors 34 and 35 and d.c. isolation capacitors 36 and 37. Capacitors 36 and 37 should of course be large enough in conjunction with the resistance of the circuit to pass the frequency of the signal without attenuation. Yet since the circuit is usefully implemented on a printed circuit board, capacitors 36 and 37 in practice cannot be physically too large.

Since signals arriving on lead 75 are applied to the T and R leads, and are also detected by differential amplifier 46, they would be applied to the lead 74. This is of course undesirable.

A fraction of the signal incoming on lead 75 is applied in opposite phase to the same signal carried by the signal path toward lead 74. The fraction of the signal is applied via the lead from operational amplifier 91, through resistor 93 to the inverting input of operational amplifier 56, the input signal level of which should be sufficient to cancel return signals at the non-inverting input of operational amplifier 56 received as described above. The fraction which is returned can be established by the resistance of resistor 93, which can be made a trimmer resistor if desired. Operational amplifier 56 corresponds generally to operational amplifier 4 in FIG. 1, resistor 93 corresponding generally to the network comprising resistors 20 and 21.

The output signal from operational amplifier 56 therefore is a true representation of the signal originating on the tip and ring leads, destined for output lead 74. This signal is carried via operational amplifiers 97 and 101 to the non-inverting input of operational amplifier 96, to be added with the incoming signal from lead 75 as described earlier, also applied to the non-inverting input of amplifier 96. The resulting signal is applied to the T and R leads via current amplifiers 32 and 33. The amount of outgoing signal added to the incoming signal should be sufficient to cause the apparent impedance at the T and R leads to be raised to the nominal tip and ring line impedance, e.g. 600 ohms or 900 ohms.

The values of capacitors 36 and 37 in some designs might be as low as 1.3 or 1.5 microfarads. As noted earlier, in this case some phase shift occurs in the signal applied to the T and R leads, relative the signal originating on the tip and ring leads. Therefore, it is desirable to precondition the return signal so that when it passes through capacitors 36 and 37 it is in phase with the signal originating on the tip and ring leads. Phase shifting network 94 applies a portion of the signal output from operational amplifier 101 through a phase shift to effect the preconditioning. However as noted earlier should capacitors 36 and 37 be sufficiently large, the phase shifting network 94 including operational amplifiers 105 and 108 can be deleted.

It may thus be seen that d.c. line current is applied through an optimum low resistance to the T and R leads for transmission to a balanced subscriber's line. Yet the impedance seen by signals originating on the line is matched to the line impedance. Current surges are carried mostly by the low valued resistors 30 and 31, but if the associated voltage exceeds a predetermined value following reduction in resistors 34 and 35, diodes 119, 120, 121, and 122 conduct, protecting the output currents of current amplifiers 32 and 33. While resistors 34 and 35 can each have a resistance value of one-half the nominal line impedance, they can also be higher value if desired, assuming that there is sufficient signal current drive by current amplifiers 32 and 33. Substantial improvement over the earlier described prior art line interface circuit is thus obtained.

Additional features may be added to the present circuit. Where there might be feedback of the outgoing signal on lead 74 received back on lead 75 via an external circuit, cancellation thereof can be obtained by applying a sample or portion of the outgoing signal from the output of operational amplifier 62 to the inverting input of operational amplifier 76. Cancellation of the feed back signal is obtained in operational amplifier 76.

While the incoming signal on unbalanced lead 75, being separated from the outgoing unbalanced lead 74, is useful for connection to a four-wire transmission path or the output and input of apparatus such as a codec, the outgoing and incoming transmission path could be bidirectional and two-wire. In this case, lead 75 is eliminated and the non-inverting input of operational amplifier 76 is connected directly to lead 74 via resistor 123. Lead 74 thus carries both incoming and outgoing signals, and typically would be connected to a junctor.

In some applications, it is desirable to split (open-circuit) the incoming signal path, the outgoing signal path, either together or alternatively. The signal paths can be split by decoding of a split enable signal received from an external control circuit by decoder 61. At the same time that switch 60 opens the outgoing signal path, the input of operational amplifier 62 is connected to ground through switch 65 to mute the outgoing signal path. Similarly at the same time that the incoming signal path is opened by switch 80 receiving an enable signal decoded in decoder 61, the input of operational amplifier 82 is connected to ground by switch 84, which receives a similar enable signal.

FIG. 3 is a schematic of a further embodiment of the line circuit, in which the incoming signal path is split from the outgoing signal path. The operation of the circuit, however, is generally similar to that of FIG. 1.

The tip T and ring R leads are connected via resistors 100 and 101 to ground at a battery source (e.g. −48 V). The inputs of operational amplifier 112 are connected to the tip and ring leads via resistors 108 and 109, the inverting input of amplifier 112 being connected to its output via resistor 110 and the non-inverting input being connected to ground via resistor 111. The resistors are resistance which is a fraction of the a.c. line impedance, (d) a pair of first amplifiers having a first predetermined gain adapted to drive the tip and ring leads differentially, (e) a pair of buildout resistors, each connected in an a.c. coupled circuit between an output of said first amplifiers and a tip or ring lead, the total resistance of the buildout resistors being a multiple of the line resistance, (f) a differential amplifier having a second predetermined gain, its inputs being respectively connected to the tip and ring leads, for receiving a differential signal from the tip and ring leads, (g) an operational amplifier having a third predetermined gain for subtracting a fraction of a signal at the incoming signal terminal from a signal at the output of the differential amplifier, the fraction being dependent on a balance network, (h) means for adding the outgoing signal from the operational amplifier to the incoming signal from the first unbalanced line and for applying a resulting sum signal to said first amplifiers for amplification and application to the tip and ring leads, said amplified sum signal containing a fraction of said received signal on the tip and ring leads and having a predetermined amplitude dependent on said predetermined gains which is sufficient to raise the apparent input impedance of the tip and ring leads at the line interface circuit to said line impedance, (i) the balance network being adapted to apply a predetermined amplitude of the incoming signal from the incoming signal terminal to the inverting input of the operational amplifier so as to substantially cancel signals incoming from the first unbalanced line applied to the input of the operational amplifier via the unbalanced line and the differential amplifier from being applied to the outgoing signal terminal.

2. A telephone line interface circuit as defined in claim 1 in which each AC coupled circuit further includes a capacitor connected between a corresponding buildout resistor and an amplifier output.

3. A telephone line interface circuit as defined in claim 2 further including two pair of diodes, each pair connected in the series aiding direction, each pair connected in its non-conductive direction between a source of positive and negative potential, the junctions between the diodes of each pair connected to corresponding junctions in the circuit paths between the outputs of the said first amplifiers and the tip and ring leads.

4. A telephone line interface circuit as defined in claim 1, 2 or 3 in which said resultant sum signal is applied to the non-inverting input of one of the pair of first amplifiers and to the inverting input of the second of the pair of first amplifiers, the remaining input of said one of the pair of first amplifiers being connected through a resistor to ground, and the remaining input of said second of the pair of first amplifiers being connected directly to ground and feedback paths being connected from each of said remaining inputs to each of associated outputs of the corresponding first amplifier.

5. A telephone line interface circuit as defined in claim 2 or 3 in which said resultant sum signal is applied to the non-inverting input of one of the pair of first amplifiers and to the inverting input of the second of the pair of first amplifiers, the remaining input of said one of the pair of first amplifiers being connected through a resistor to ground, and the remaining input of said second of the pair of first amplifiers being connected directly to ground and feedback paths being connected from each of said remaining inputs to the junction of the capacitor and buildout resistor connected to the associated first amplifier.

6. A telephone line interface circuit as defined in claim 2 or 3 in which said resultant sum signal is applied to the inverting input of one of the pair of first amplifiers and to the inverting input of the second of the pair of first amplifiers, the remaining input of said one of the pair of first amplifiers being connected through a resistor to ground, and the remaining input of said second of the pair of first amplifiers being connected directly to ground and a feedback resistor and capacitor in parallel being connected from each of said remaining inputs to the junction of the capacitor and buildout resistor connected to the associated first amplifier.

* * * * *